June 7, 1955 — H. W. CARDWELL — 2,710,078
FLEX PLATE AIR BRAKE
Filed May 17, 1951 — 2 Sheets-Sheet 1

INVENTOR
Harland W. Cardwell
BY Bacon & Thomas
ATTORNEYS

June 7, 1955  H. W. CARDWELL  2,710,078
FLEX PLATE AIR BRAKE
Filed May 17, 1951  2 Sheets-Sheet 2
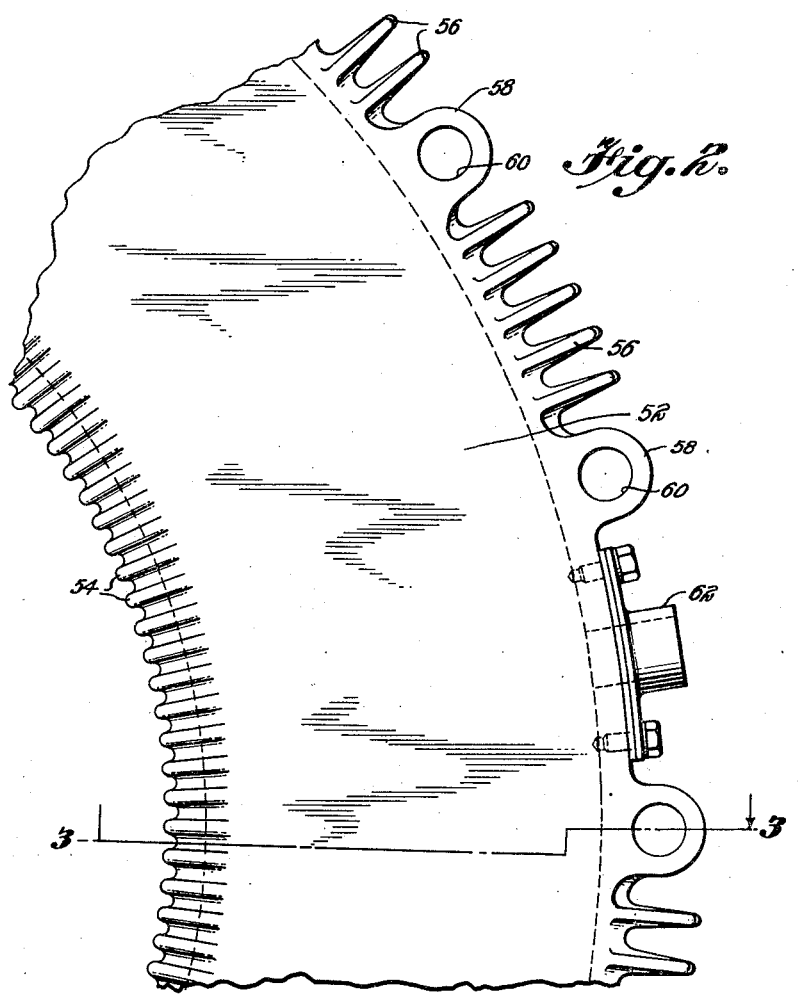
INVENTOR
Harland W. Cardwell
BY Bacon & Thomas
ATTORNEYS – # United States Patent Office 2,710,078
Patented June 7, 1955

2,710,078

FLEX PLATE AIR BRAKE

Harland W. Cardwell, Wichita, Kans., assignor to Cardwell Manufacturing Company, Inc., Wichita, Kans.

Application May 17, 1951, Serial No. 226,851

3 Claims. (Cl. 188—152)

This invention relates to brakes and particularly to pneumatic brakes adapted to handle unusually large loads and to be adequately cooled.

According to the present invention, a brake structure is provided especially adaptable for use with heavy hoisting equipment, such as a draw works drum in well drilling or servicing equipment. The brake comprises essentially a pneumatically expansible member between axially flexible plates carried by a rotatable member. The plates carry friction facing material near their outer peripheries and expansion of the pneumatic means causes the plates to flex away from each other and frictionally engage stationary braking surfaces. The braking surfaces are portions of annular hollow structures adapted to have a suitable coolant circulated therethrough.

It is therefore an object of this invention to provide a brake having no slidably movable parts.

It is another object of this invention to provide a brake having means for dissipating frictionally generated heat.

Still another object of this invention is to provide a multiple surface friction brake wherein each of the friction surfaces is provided with cooling means therefor.

It is a still further object of this invention to provide a friction brake wherein the operating mechanisms are completely enclosed and protected from foreign matter.

Another object of this invention is to provide a brake wherein the movable parts are supported by flexible structures to thereby eliminate relative sliding movement between the parts during setting or releasing of the brake.

It is another object of this invention to provide a brake capable of handling large loads yet one that is simple and rugged in construction and economical to manufacture.

Further objects and advantages will appear to those skilled in the art as the description proceeds in connection with the accompanying drawings, wherein:

Fig. 2 is a fragmentary elevational view of a modified form of pressure member; and Fig. 3 is a sectional view taken substantially on the line 3—3 of Fig. 2.

Figure 1:
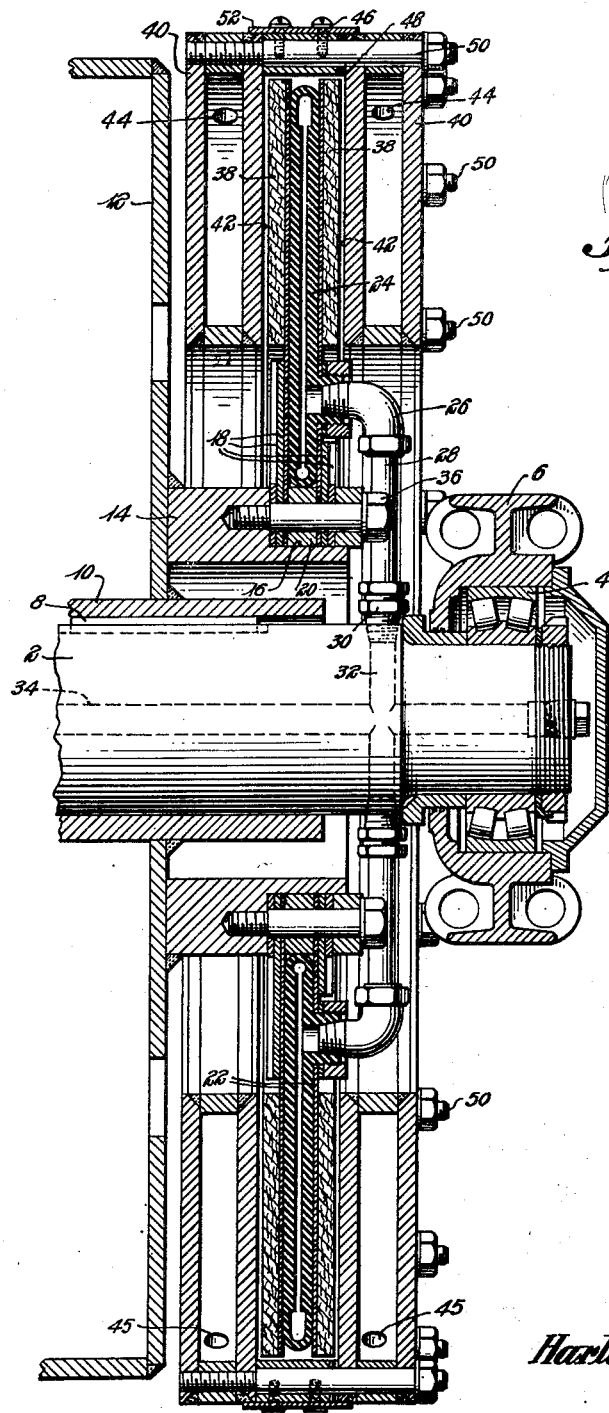
Fig. 1 is an axial sectional view of the brake of the present invention, parts being omitted for clarity of illustration.

Referring now to Fig. 1 of the drawings, numeral 2 identifies a shaft rotatably mounted by suitable bearings 4 in a fixed bracket 6 mounted on a stationary frame (not shown). The shaft 2 may have keyed thereto as by a key 8 any suitable structure such as the hub portion 10 of a winding drum (not shown). The shaft 2 is intended to be driven by any suitable means to effect the desired rotation of the drum or other mechanisms carried thereby. The winding drum may include a plate 12 suitably welded or otherwise affixed to the hub 10, which plate 12 has an annular ring 14 welded thereto concentrically about the axis of hub 10. The ring 14 is provided with an outwardly facing rabbet 16 extending around its outer periphery. Seated in the rabbet 16 is an expansible flexible plate structure comprising the rotatable portion of the brake. This flexible plate structure is substantially identical with that disclosed in copending application Serial No. 161,190, filed May 10, 1950, and now Patent Number 2,563,673, issued August 7, 1951. That copending application is directed to a clutch. As shown in the copending application, the expansible flexible plate structure comprises spring discs 18 having radially extending resilient fingers. The spring discs 18 are separated by a suitable spacer 20 and a pair of annular flexible discs 22 are arranged between the spacer 20 and the spring discs 18 providing a space therebetween for the reception of a suitable inflatable annular bag 24. The inflatable member 24 may be of rubber or any other suitable material. The spring discs 18 and the flexible plates 22 on one side of the structure are provided with aligned openings through which a suitable fitting 26 may extend and be attached to the inflatable bag 24 to conduct air under pressure thereto all as shown in the copending application referred to.

The fitting 26 may be connected by means of a pipe or tube 28 to fittting 30 on the shaft 2. The fitting 30 provides communication with a transverse passageway 32 and a longitudinal passageway 34 formed in the shaft 2. The spring discs 18, the flexible plates 22 and the spacer 20 are clamped to the annular ring 14 in the rabbet 16 by cap screws 36 or other suitable fastening means adapted to rigidly unite the described flexible structures and the ring 14. Suitable connections (not shown) provide connection between longitudinal passageway 34 and a source of pneumatic pressure. Such connecting means may include manually controllable valves whereby the brake may be set or released at will and at any pressure desired.

At their outer peripheries, the flexible plates 22 are provided with friction facings 38 on the outer faces thereof. The facings 38 may be cemented or riveted to the plates 22 or secured thereto in any other suitable manner. A pair of pressure members 30 define opposed faces 42 opposing and closely adjacent the outer surfaces of the friction facings 38. The pressure members 40 comprise hollow annular members fixed in spaced relation to each other and suitably mounted on the fixed frame, heretofore referred to but not shown. The pressure members 40 are annular in shape and extend concentrically about the shaft 2.

In the form shown in Fig. 1, the pressure members 40 are structures fabricated from separate plates welded together to provide the desired structure. Each of the pressure members 40 is, as shown, hollow and defines an annular hollow interior for the reception and circulation of a suitable cooling medium. Openings 44 and 45 may be provided to admit the coolant to the hollow interiors of the pressure members and to conduct the same away. Suitable fittings and conduits and suitable pump means (not shown) are provided for effecting circulation of a coolant, which may be water, through the pressure members.

The pressure members 40 are held in spaced relationship by means of spacers 46 positioned therebetween adjacent the outer peripheries of the pressure members and outwardly of the peripheries of the flexible plates 22. Preferably, a plurality of shims 48 are positioned between the spacers 46 and one of the pressure members. The shims 48 may be in the form of thin washers surrounding a bolt 50 which holds the pressure members and spacers in assembled relationship as a rigid unit. The spacers 46 are preferably separate spaced elements. An annular cover plate 52 overlies the spacer washers 48 and spacer elements 46, extends peripherally around the brake structure and its edges overlie peripheral portions of the pressure members 40. The cover plate 52 thus encloses the space between the pressure members and provides protection against the entry of foreign matter. The cover plate 52 is not essential and may be omitted if desired. The spacers 46 and bolts 50 constitute holding means for holding the pressure members 40 in axially spaced fixed relation to each other.

The pressure members 40 and the spacers 48 along with bolts 50 comprise an annular structure having an inwardly facing groove or channel in which the expansible rotor member of the brake is positioned.

It will be readily apparent that admission of pneumatic pressure fluid, such as compressed air, to the interior of the inflatable bag 24 will cause the latter to expand and flex the outer portions of the plates 22 axially away from each other to force their friction facings 38 into pressure contact with surfaces 42 of the pressure members 40. Since the shaft 2 and flexible plates 22 are rotating at this time, while the pressure members are held stationary in the embodiment shown, it will be obvious that the frictional contact between facings 38 and surfaces 42 will apply a braking force to the shaft 2 and thus retard or stop its rotation. The heat generated by the brake is readily dissipated into the coolant being circulated through the hollow pressure members. Clearly, the flexible plates 22 could be stationarily mounted and the pressure members fixed to the rotating shaft.

In the event the friction facings 38 wear substantially, the bolts 50 may be removed and one or more shims 48 removed from the assembly whereby reassembly will position the surfaces 42 closer together and thus compensate for the wear of the friction facings 38. The addition or removal of shims 48 also permits adjustment of the opposed faces 42 to provide the desired clearance on initial assembly of the apparatus.

Figures 2 and 3 illustrate a modified form of pressure member, identified by numberal 52. The pressure members of this modification, like those of Fig. 1, comprise annular hollow structures having flat axially directed faces for engagement by the friction facings. In this modification, however, each of the pressure members is an integral structure which may be cast as a unit and is provided with inwardly directed fins 54 and outwardly directed fins 56 at its inner and outer peripheries, respectively. The fins 54 and 56 further assist in cooling the structure by dissipating heat into the surrounding air. At their outer peripheries, the modified pressure members 52 are provided with a series of peripherally spaced integral lugs 58 having openings 60 therethrough. The lugs 58 and openings 60 provide means whereby bolts such as the bolts 50 of Fig. 1 may be employed to assemble a pair of the pressure members 52 and spacers, such as 48, into a rigid unitary structure. When employing the pressure members of Fig. 2, the cover plate 52 is omitted. Thus, rotation of the shaft 2 and the brake mechanism carried thereby will cause an outward circulation of air between the pressure members 52 to insure efficient heat dissipation by the fins 54 and 56. The lugs 58 and openings 60, and corresponding portions of the pressure members of Fig. 1, constitute attaching means for the pressure members.

Suitable fittings 62 may be bolted or otherwise secured to the pressure members 52 to provide communication with the interiors thereof for criculation of cooling fluid.

It is to be noted that the pressure members 40 and 52 each have opposite parallel faces and are so constructed that they may be reversed in the assembly. This feature doubles the useful life of each pressure member since any one or all of them may be reversed to use the opposite face when one face becomes unduly worn or scored. The pair of pressure members of each embodiment are also of identical size and shape so as to be interchangeable in addition to being reversible.

While a limited number of embodiments of the present invention are illustrated herein, it is to be understood the scope of the invention is not to be limited thereto but is to cover all modifications falling fairly within the scope of the appended claims.

I claim:

1. In a brake, a rotor concentric about an axis and having an axially expansible portion provided with oppositely facing friction surfaces, a stator comprising a pair of substantially identical hollow annular pressure members, holding means for holding said pressure members in axially spaced fixed relation to each other and concentric about said axis, attaching means on said pressure members for engagement by said holding means, each of said pressure members having an axially facing braking surface closely adjacent a friction surface of said rotor to be engaged thereby, and a similar surface on its axially opposite side, said pressure members and attaching means being symmetrical about a medial plane therethrough normal to said axis whereby each of said pressure members may be reversed to selectively position either of its said surfaces adjacent said friction surface and whereby said pressure members may be interchanged in addition to being reversed.

2. A brake as defined in claim 1 wherein said holding means includes spacing means between said pressure members outwardly of said rotor and elements holding said pressure members and spacing means together as a single rigid structure, and a cover plate overlying said spacing means and the adjacent peripheral portions of said pressure members whereby to completely enclose the outer periphery of the space between said pressure members.

3. A brake as defined in claim 1 wherein the braking surfaces on each of said pressure members are annular, planar, smooth and parallel, and wherein each pressure member is provided with fittings to conduct a coolant to and from the hollow interior thereof and with radially directed integral fins at its inner and outer edges.

References Cited in the file of this patent

UNITED STATES PATENTS

| | | |
|---|---|---|
| 1,777,810 | Snell | Oct. 7, 1930 |
| 1,972,353 | North et al. | Sept. 4, 1934 |
| 2,040,464 | Cameron et al. | May 12, 1936 |
| 2,064,553 | Mack | Dec. 15, 1936 |
| 2,174,635 | Linderman | Oct. 3, 1939 |
| 2,199,785 | Dickson | May 7, 1940 |
| 2,381,941 | Wellman et al. | Aug. 14, 1945 |

FOREIGN PATENTS

| | | |
|---|---|---|
| 728,036 | France | June 28, 1932 |